United States Patent
Iguchi

(10) Patent No.: US 9,499,001 B2
(45) Date of Patent: Nov. 22, 2016

(54) IMAGE ELIMINATION APPARATUS, IMAGE ELIMINATING METHOD AND IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Ken Iguchi, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/939,477

(22) Filed: Nov. 12, 2015

(65) Prior Publication Data

US 2016/0075160 A1 Mar. 17, 2016

Related U.S. Application Data

(60) Continuation of application No. 14/454,479, filed on Aug. 7, 2014, now Pat. No. 9,219,828, which is a continuation of application No. 13/965,999, filed on Aug. 13, 2013, now Pat. No. 8,838,013, which is a (Continued)

(30) Foreign Application Priority Data

Jul. 29, 2009 (JP) ................. 2009-176054

(51) Int. Cl.
*G03G 15/00* (2006.01)
*B41M 7/00* (2006.01)
(Continued)

(52) U.S. Cl.
CPC .......... *B41M 7/0009* (2013.01); *G03G 15/095* (2013.01); *G03G 15/6529* (2013.01);
(Continued)

(58) Field of Classification Search
CPC ...................................... B41J 2202/37
USPC ......................................... 399/407
See application file for complete search history.

(56) References Cited

U.S. PATENT DOCUMENTS 3,108,895 A 10/1963 Howell
4,447,832 A 5/1984 Kurata et al.
(Continued)

FOREIGN PATENT DOCUMENTS

JP H07-041559 2/1995
JP H07-239630 9/1995
(Continued)

OTHER PUBLICATIONS

Japanese Office Action dated Feb. 15, 2012, filed in Japanese counterpart Application No. 2009-176054, 7 pages (with English translation).

*Primary Examiner* — Anthony Nguyen
(74) *Attorney, Agent, or Firm* — Patterson & Sheridan, LLP

(57) ABSTRACT

According to an embodiment, an image elimination apparatus eliminates an image formed on a sheet. A sheet supply unit supplies the sheet on which the image is formed. A first reader reads the sheet supplied by the sheet supply unit. An image eliminator eliminates the image formed on the supplied sheet. A second reader reads the sheet passing through the image eliminator. A discharge unit stacks the sheet to be discharged. A controller causes the first reader to read the sheet at a first speed in order to judge whether the sheet is reusable or not based on the reading result of the first reader. The controller also causes the second reader to read the sheet at a second speed faster than the first speed in order to judge whether the image formed on the sheet has been eliminated or not based on the reading result of the second reader.

8 Claims, 14 Drawing Sheets

Related U.S. Application Data division of application No. 12/555,091, filed on Sep. 8, 2009, now Pat. No. 8,538,317.

(60) Provisional application No. 61/112,649, filed on Nov. 7, 2008.

(51) Int. Cl.
*H04N 1/00* (2006.01)
*G03G 15/095* (2006.01)
*G03G 21/00* (2006.01)

(52) U.S. Cl.
CPC ...... *G03G15/6573* (2013.01); *G03G 21/0005* (2013.01); *H04N 1/00037* (2013.01); *H04N 1/0057* (2013.01); *H04N 1/00612* (2013.01); *G03G 2215/00717* (2013.01); *H04N 2201/0081* (2013.01); *H04N 2201/0094* (2013.01)

(56) References Cited

U.S. PATENT DOCUMENTS

| | | | |
|---|---|---|---|
| 5,353,108 A | 10/1994 | Tsukamoto | |
| 5,574,538 A | 11/1996 | Takahashi et al. | |
| 5,596,363 A * | 1/1997 | Christian | H04N 13/0434 348/58 |
| 5,612,766 A | 3/1997 | Ida et al. | |
| 5,621,939 A | 4/1997 | Yoshida et al. | |
| 5,689,754 A | 11/1997 | Yoshida et al. | |
| 5,753,400 A | 5/1998 | Kuramoto et al. | |
| 5,769,957 A | 6/1998 | Murakami et al. | |
| 5,956,052 A | 9/1999 | Udagawa et al. | |
| 6,189,173 B1 | 2/2001 | Saito et al. | |
| 6,203,603 B1 | 3/2001 | Takayama et al. | |
| 6,236,831 B1 | 5/2001 | Mei et al. | |
| 6,329,317 B1 | 12/2001 | Takayama et al. | |
| RE37,645 E | 4/2002 | Takahashi et al. | |
| 6,375,742 B2 | 4/2002 | Sano et al. | |
| 6,412,902 B2 * | 7/2002 | Matsumoto | B41J 29/393 347/19 |
| 6,466,764 B2 | 10/2002 | Jacob et al. | |
| 6,544,601 B1 | 4/2003 | Kong | |
| 6,628,903 B1 | 9/2003 | Ohori et al. | |
| 6,832,055 B2 | 12/2004 | Ochiai | |
| 7,283,758 B2 | 10/2007 | Murakami | |
| 8,109,597 B2 | 2/2012 | Hori | |
| 8,538,280 B2 | 9/2013 | Yahata et al. | |
| 2004/0202489 A1 * | 10/2004 | Kudou | G03G 15/0131 399/66 |
| 2004/0238767 A1 * | 12/2004 | Steklenski | G01T 1/2016 250/588 |
| 2005/0141904 A1 * | 6/2005 | Yonenaga | G03G 15/5083 399/27 |
| 2005/0199836 A1 * | 9/2005 | Hall | G03B 42/08 250/588 |
| 2009/0154970 A1 | 6/2009 | Yoshida et al. | |
| 2012/0306985 A1 * | 12/2012 | Iguchi | B41J 2/32 347/179 |

FOREIGN PATENT DOCUMENTS

| | | |
|---|---|---|
| JP | 8-006446 | 1/1996 |
| JP | H10-161492 | 6/1998 |
| JP | H11-249511 | 9/1999 |
| JP | 2007-139942 | 6/2007 |
| JP | 2007-322969 | 12/2007 |

* cited by examiner

IMAGE ELIMINATION APPARATUS, IMAGE ELIMINATING METHOD AND IMAGE FORMING APPARATUS

CROSS-REFERENCE TO RELATED APPLICATION

This application is a continuation of U.S. patent application Ser. No. 14/454,479, filed Aug. 7, 2014, which is a continuation of U.S. patent application Ser. No. 13/965,999, filed Aug. 13, 2013, now issued as U.S. Pat. No. 8,838,013 on Sep. 16, 2014, which is a division of U.S. patent application Ser. No. 12/555,091, filed Sep. 8, 2009, now issued as U.S. Pat. No. 8,538,317 on Sep. 17, 2013, which is based upon and claims the benefit of priority from U.S. Provisional Patent Application No. 61/112,649, filed on Nov. 7, 2008 and Japanese Patent Application No. 2009-176054, filed on Jul. 29, 2009; the entire contents of each of the applications are incorporated herein by reference.

FIELD OF THE INVENTION

The present invention relates to an image elimination apparatus for eliminating an image from a sheet with the image formed and enabling reuse of the sheet, an image eliminating method, and an image forming apparatus.

BACKGROUND OF THE INVENTION

In recent years, from the standpoint of resource usage by recycle, there is an increasing demand for an image forming and eliminating apparatus for enabling elimination of an image from a sheet with the image formed and reuse of the sheet. An apparatus for eliminating an image from a sheet with the image formed is disclosed in, for example, Japanese Patent Application Publication No. 8-6446.

However, even if the image is eliminated, whether the sheet itself with the image formed can be reused or not is not clear. Furthermore, after elimination, whether the image on the sheet is eliminated or not is unknown.

SUMMARY OF THE INVENTION

The present invention is intended to provide an image elimination apparatus having a function for judging whether a sheet intended to be reused is reusable or not, an image eliminating method, and an image forming apparatus.

To achieve the above advantage, the aspect of the present invention is to proved an image elimination apparatus comprising a first reader configured to read the status of a sheet, a first judgment portion configured to judge whether the read sheet is reusable or not, an image eliminator configured to eliminate the image formed on the sheet, a second reader configured to read the sheet passing through the image eliminator, a second judgment portion configured to judge whether the image formed on the sheet is eliminated or not, and a controller configured to controlling the first reader and the second reader so as to read with different reading precision.

To achieve the above advantage, the aspect of the present invention is to proved an image eliminating method comprising reading a status of a sheet and first judging whether the sheet is reusable or not, eliminating the image formed on the sheet, and second judging whether the image is eliminated at the eliminating or not, wherein reading precision at the first judging and reading precision at the second judging are different from each other.

To achieve the above advantage, the aspect of the present invention is to proved an image forming apparatus comprising an image forming portion configured to form an image on a sheet and an image elimination apparatus configured to eliminate the image on the sheet formed by the image forming portion, wherein the image elimination apparatus includes a first reader configured to read the status of a sheet, a first judgment portion configured to judge whether the read sheet is reusable or not, an image eliminator configured to eliminate the image formed on the sheet, a second reader configured to read the sheet passing through the image eliminator, a second judgment portion configured to judge whether the image formed on the sheet is eliminated or not, and a controller configured to control the first reader and the second reader so as to read with different reading precision.

DETAILED DESCRIPTION OF THE INVENTION

Hereinafter, the first embodiment of the present invention will be explained with reference to FIGS. 1 to 5.

Figure 1:
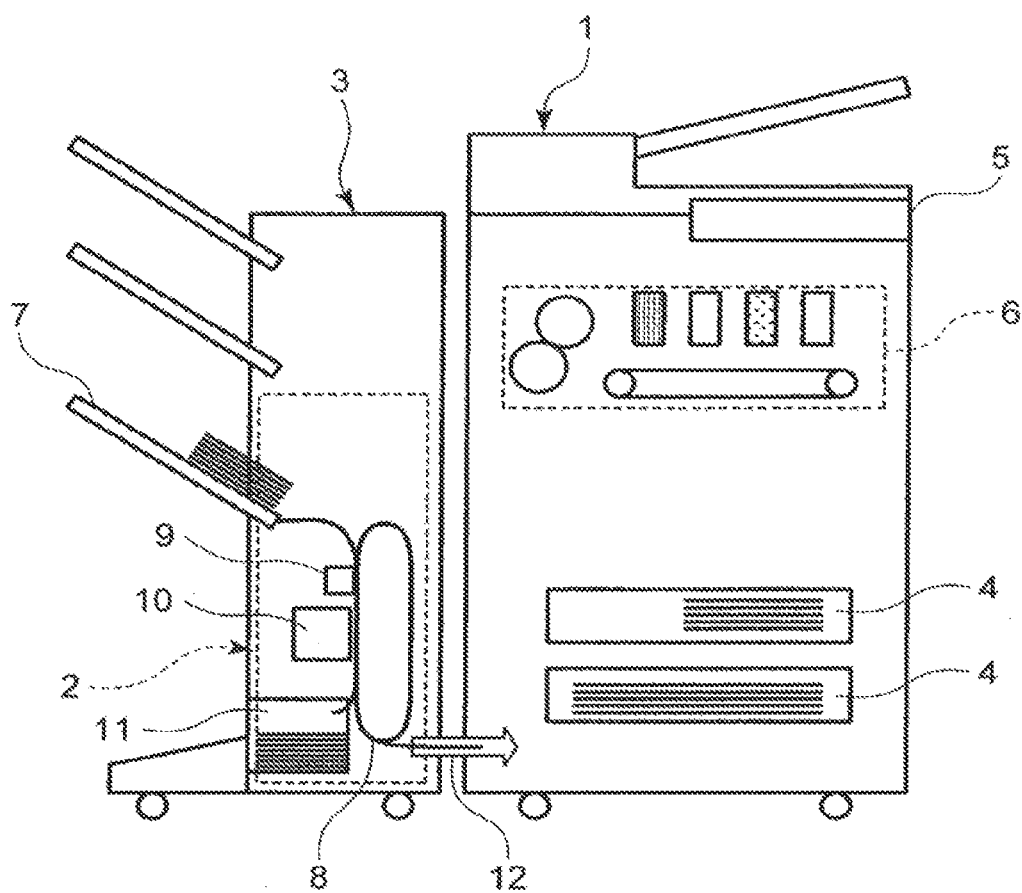
FIG. 1 is a schematic block diagram of the image forming apparatus of the first embodiment.
Figure 2:
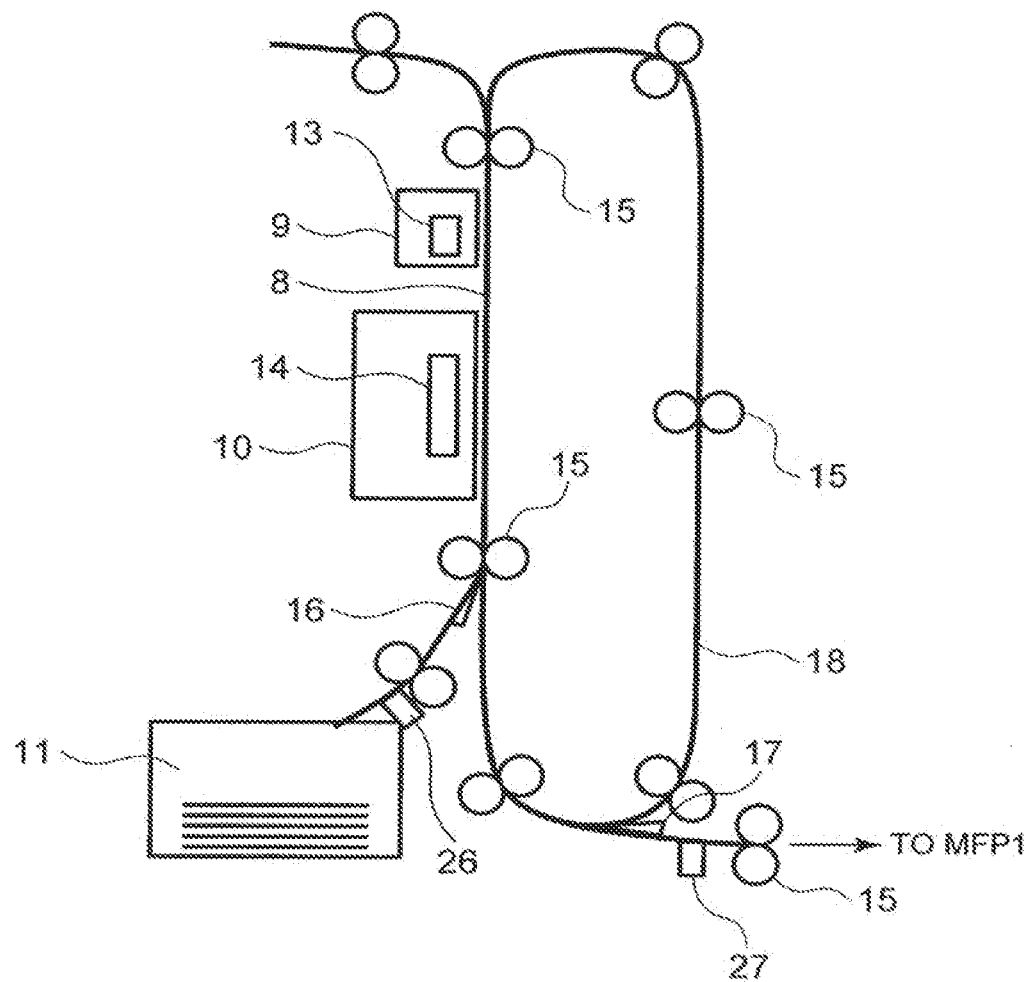
FIG. 2 is a schematic view of the image elimination apparatus of the first embodiment.

FIG. 1 is a schematic view of the image forming apparatus (hereinafter, abbreviated to MFP) 1 to which a post-processing device 3 having a built-in image elimination apparatus 2 of the present invention and FIG. 2 is an enlarged schematic view of the image elimination apparatus 2.

The MFP 1 forms an image on sheets supplied from a sheet cassette 4 and feeds the image-formed sheets to the post-processing device 3. The MFP 1, according to the user input to a control panel 5, on the sheets which are supplied one by one from the sheet cassette 4, forms the image by an image forming portion 6, for example, by an electrostatic photographic recording system. Further, the MFP 1, using ink or toner using a coloring material which is achromatized by applying heat higher than a certain temperature for a predetermined period of time, forms the image on the sheets. The post-processing device 3, for example, sorts or stables the sheets with the image formed by the MFP 1.

The image elimination apparatus 2 includes a sheet supply tray 7, a reader 9 and an image eliminator 10 which are installed along a first sheet conveying path 8, a stack box 11 installed to abolish sheets judged as nonreusable, and a discharge port 12 for feeding sheets to the MFP 1.

On the sheet supply tray 7, the sheets with the image formed are stacked. The reader 9 has a CCD sensor 13. The CCD sensor 13, as described later, to judge whether the sheets are usable or not and the print of the sheets is eliminated or not, reads the surface of each of the sheets. The image eliminator 10 has internally a heater 14 and eliminates the image printed on the sheets by heat. On the first sheet conveying path 8, a plurality of rollers 15 are installed and the sheets are conveyed by the plurality of rollers 15. Further, on the first sheet conveying path 8, a first flapper 16 and a second flapper 17 are installed. The first flapper 16 separates the sheets judged as nonreusable from the first sheet conveying path 8. The sheets separated by the first flapper 16 are guided to the stack box 11. Between the first flapper 16 and the stack box 11, a first sensor 26 is installed. The second flapper 17 is installed immediately before the discharge port 12 to the MFP 1 and guides the sheets to a second sheet conveying path 18 for conveying again the sheets with the image eliminated by the image eliminator 10 to the reader 9. Also on the second sheet conveying path 18, the plurality of rollers 15 for conveying sheets are installed. On the image elimination apparatus 2, a pick-up roller for taking out sheets one by one from the sheet supply tray 7 and feeding the sheets to the first sheet conveying path 8 is installed. Between the second flapper 17 and the discharge port 12, a second sensor 27 is installed.

Figure 3:
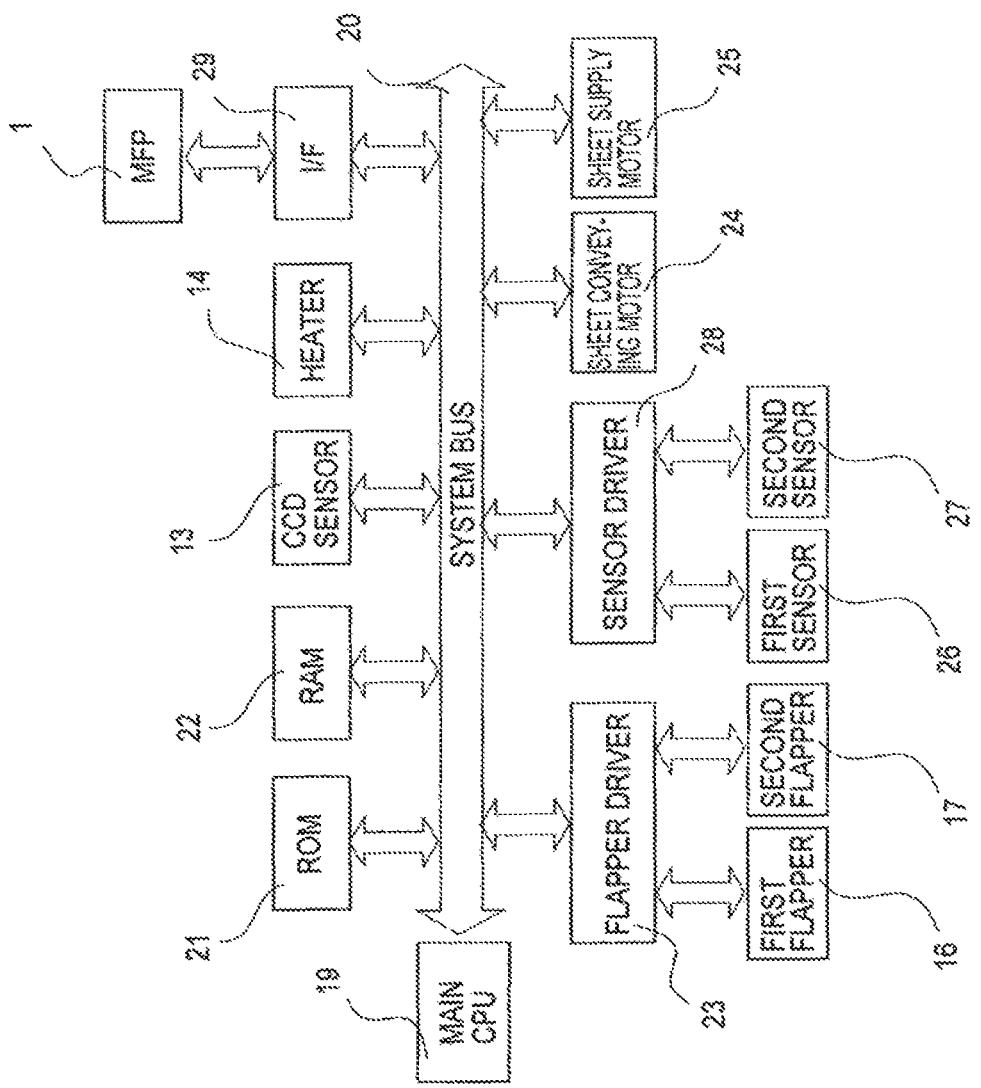
FIG. 3 is a block diagram showing a system including the image elimination apparatus and image forming apparatus of the first embodiment.

FIG. 3 is a block diagram showing the electrical connection of the image elimination apparatus 2. To a CPU 19, via a system bus 20, a ROM 21, a RAM 22, the CCD sensor 13 of the reader 9, the heater 14 of the image eliminator 10, a flapper driver 23 for controlling the first flapper 16 and second flapper 17, a sheet conveying motor 24, a sheet supply motor 25, and a sensor driver 28 for controlling the first sensor 26 and second sensor 27. Further, the CPU 19 communicates with the MFP 1 by an interface 29 connected via the system bus 20. In the ROM 21, a program for operating the CPU 19, a density threshold value used to decide the fold depth of sheets, a density threshold value for checking whether the image is eliminated from the sheets or not, and data of the print rate of the sheets which is an index of usable or unusable are stored. In the RAM 22, the highest density of the image obtained when reading the status of a sheet and the position information indicating the highest density are stored. The CCD sensor 13 is arranged as a row of line sensors and detects the color shade of sheet. The heater 14 uses an IH heater and while the sheet passes through the image eliminator 10, applies heat to the sheet and achromatizes the coloring material. The CPU 19 drives respectively the first flapper 16 and second flapper 17 via the flapper driver 23 and separates the sheet from the first sheet conveying path 8.

Figure 4:
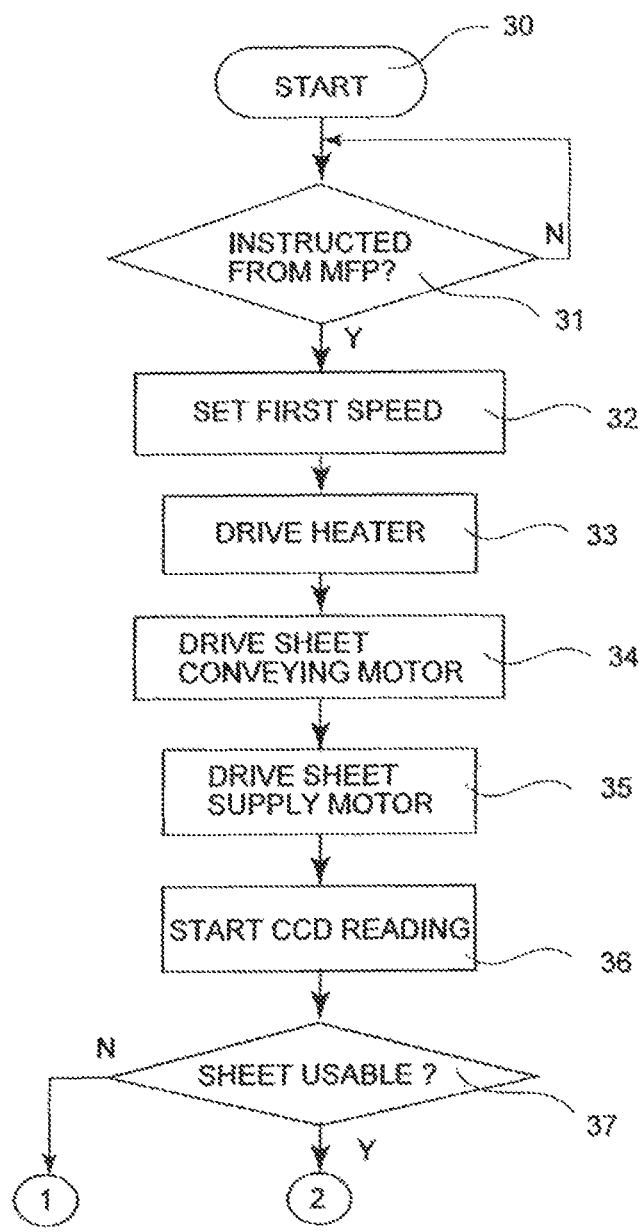
FIG. 4 is a flow chart showing the process of the first embodiment.
Figure 5:
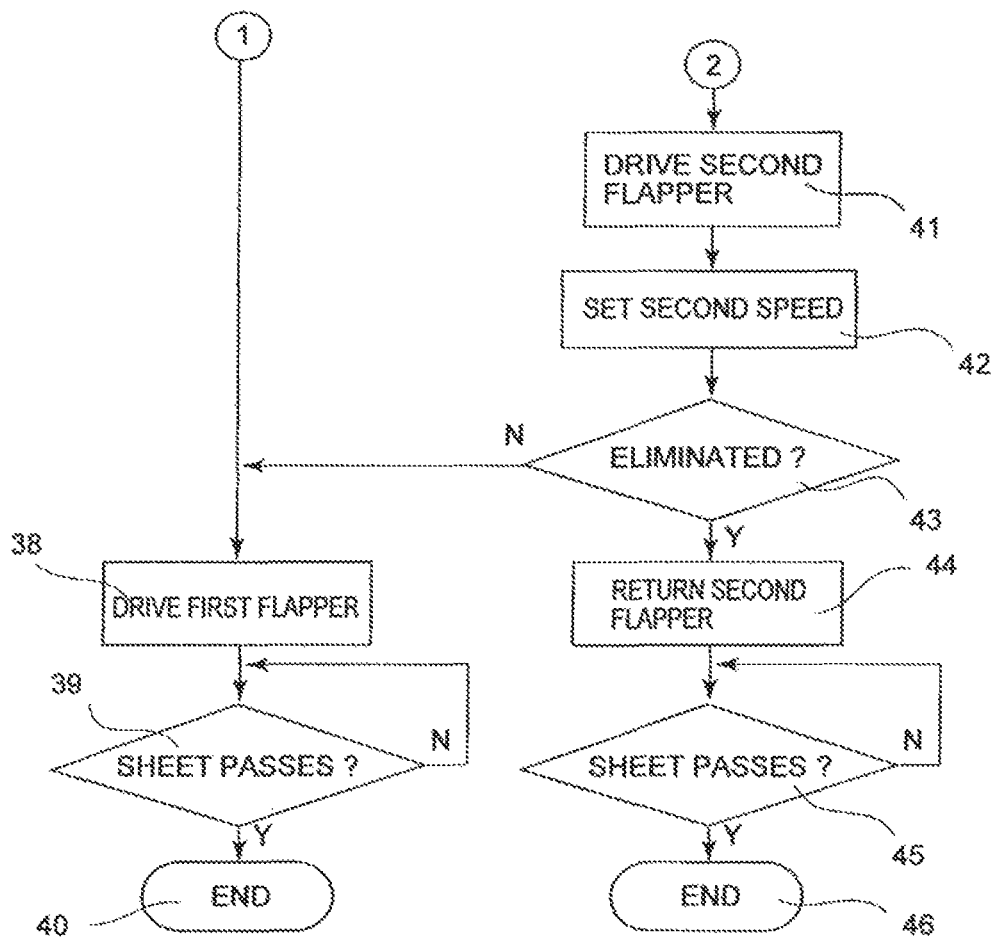
FIG. 5 is a flow chart showing the process of the first embodiment.

FIGS. 4 and 5 are a flow chart showing the flow of the program stored in the ROM 21. Firstly, a user instructs image elimination of the sheet put on the sheet supply tray 7 from the control panel 5 (30). Then, the CPU 19 receives an elimination command from the MFP 1 via the interface 29 (31), in order to read the status of the sheet and eliminate surely the image from the sheet, sets the sheet conveying speed to a first speed (32), drives the heater 14 of the image elimination apparatus 2 (33), and drives the sheet conveying motor 24 (34). Next, the CPU 19 drives the sheet supply motor 25 (35), picks up one sheet from the sheets stacked on the sheet supply tray 7, and feeds the sheet to the first sheet conveying path 8.

The sheet fed to the first sheet conveying path 8 is guided to the reader 9 by the rollers 15. At the point of time when the leading edge of the sheet reaches the reader 9, the CCD sensor 13 of the reader 9 starts reading (36), during passing of the sheet through the CCD sensor 13, reads the image on the sheet surface, and judges whether the sheet is usable or not (37). Hereinafter, an operation of reading the status of a sheet to judge the possibility of reuse such as existence of creases and corner folds of the sheet or a high print rate is referred to as first reading. If the first reading finds creases of the sheet or corner folds thereof or that the print rate is high, thus elimination is difficult, the sheet is judged as unusable. And, the CPU 19 drives the first flapper 16 (38), guides the sheet to the stack box 11, and when judging that the sheet passes through the first sensor 26 installed at the entrance of the stack box 11 (39), finishes the elimination process (40). Further, in the case of the first reading, to store the highest density data and the position data indicating the density in the RAM 22 and in the case of reading to be executed after elimination of the image which will be described later, use the stored data is possible. The highest density is referred to as integration of either or both of the highest value of the print rate in divided several regions of the sheet and the highest value of the output of the CCD sensor 13. The highest density is used in comparison of the density read by the reader 9 with the threshold value stored beforehand in the ROM 21.

A sheet having corner folds may cause sheet jamming to the apparatus. The sheet having creases, due to the roughness of the sheet surface owing to creases, may cause variations in adhesion of toner and ink. A deeply folded sheet may also cause variations in toner adhesion. Therefore, the CPU 19, to avoid a mechanical failure and a defective image quality, judges the sheet having creases or corner folds as nonreusable.

To a sheet judged as reusable by the first reading, that is, a crease-free sheet or a low-print-rate sheet, the image eliminator 10 applies heat by the heater 14 and eliminates the image. Hereafter, the CPU 19 drives the second flapper 17 (41) and guides the sheet passing through the image eliminator 10 to the first sheet conveying path 8 on the upstream side of the reader 9 via the second sheet conveying path 18. Next, the CPU 19 sets the sheet conveying speed to a second speed higher than the first speed used when executing the first reading and image elimination (42), permits again the CCD sensor 13 of the reader 9 to read and pass the pixels, and checks whether the image is eliminated or not (43). Hereinafter, to read an image on a sheet by the CCD sensor 13 to check whether the image is eliminated or not is referred to as second reading. As the sheet conveying speed is increased, reading of the pixels becomes rough. Therefore, as the conveying speed when the sheet passes through the reader 9 is increased, the reading precision is lowered. Further, when executing the first reading, among the image formed on the sheet, the position data indicating the highest density is stored in the RAM 22 and when executing the second reading, only the position indicating the highest density stored in RAM 22 and the periphery thereof are read and that the image is eliminated at the position can be judged, so that that the entire image of the sheet is eliminated can be decided.

Here, the reason that the first reading precision is made higher than the second reading precision will be explained. As described before, at the time of the first reading, to read creases and corner folds of the sheet and the highest density and judge the possibility of reuse of the sheet is an object. The image elimination apparatus 2 itself cannot predict beforehand the location of creases or corner folds and the location indicating the highest density, and the density obtained from the part of creases or corner folds and the pattern shape thereof are usually irregular, and the contrast of the part of creases or corner folds is lower than that of the part with an image of characters formed. In order to judge existence of creases or corner folds, to read the entire sheet with such precision as to recognize the density, pattern shape, and contrast and reserve the processing time for judging the creases or corner folds is necessary. Therefore, to switch the sheet conveying speed to a considerably slow speed (for example, in consideration of perfect image elimination by the image eliminator 10 following the first reading, about 21 cm, which is the length of an A4-sized sheet in the lateral direction, per minute) is desired. As mentioned above, the first reading precision can be read at the conveying speed at the time of sheet elimination, so that as a result, the reading precision is improved extremely. On the other hand, in the second reading, that effective elimination of the image can be even recognized is desirable. For example, if the elimination object is a document image, the image is arranged almost regularly, so that there is no need to recognize as far as the density pattern shape and even if the image is read at such a speed as recognizing existence of the image, there are few problems imposed. Furthermore, the image elimination is executed for the entire sheet by taking time, so that if the elimination of the image at the location showing the highest density can be even recognized, that other images are also eliminated may be assumed.

In the second reading, when there exists a pixel indicating a predetermined density or higher on a sheet and that the image is not eliminated is judged, in order to drive the first flapper 16 and abolish the sheet, the CPU 19 guides the sheet to the stack box 11 and when judging that the sheet passes through the first sensor 26, finishes the process (40). At 43, there exists no pixel indicating the predetermined density or higher on the sheet and when judging that the image is eliminated, the CPU 19 returns the second flapper 17 (44) and guides the sheet from the discharge port 12 into the MFP 1. When judging that the sheet passes through the second sensor 27 installed at the entrance of the MFP 1 (45), the CPU 19 finishes the elimination process (46).

Here, the sheet guided into the MFP 1 is stored in the sheet cassette 4 installed in the MFP 1. The sheet stored in the sheet cassette 4, by an instruction of selection of the sheet cassette from the control panel 5 of the MFP 1, is used for image formation of the MFP 1. Further, when not detecting that the sheet does not pass through the first sensor 16 or the second sensor 17 for a predetermined period of time after the sheet supply motor 25 for picking up the sheet from the sheet cassette 4 is driven, the CPU 19 displays an occurrence of sheet jamming in the image elimination apparatus 2 on the control panel 5 installed on the MFP 1 and notifies the sheet jamming to the user. Further, when the image elimination apparatus is not connected to the MFP 1 and has no display unit, to notify no connection of the image elimination apparatus to the user by a warning sound or a voice is possible.

Further, when a plurality of sheets are set on the sheet supply tray 7, if the heater 14 is repeatedly turned on or off each time, the life span of the heater is shortened. If the heater 14 is turned off once, there are possibilities of an occurrence of failure such that until the heater reaches an appropriate temperature after the heater is turned on thereafter, a long period of time is taken. Therefore, after the heater 14 is turned on, until the sheets on the sheet supply tray 7 are all used up, regardless of the possibility of reuse of the sheets, the heater 14 is kept on. And, the sensor installed on the sheet supply tray 7 detects that the sheets are all gone and then after confirming that the sheets pass through the heater 14, the CPU 19 turns off the heater 14.

By use of the aforementioned constitution, the reading for judging the possibility of reuse of the sheet on which the image is formed is executed with high precision, and the reading for checking image elimination is executed with lower precision, and the same reading portion is used for both readings, so that a small image elimination apparatus having a high processing speed can be provided.

Figure 6:
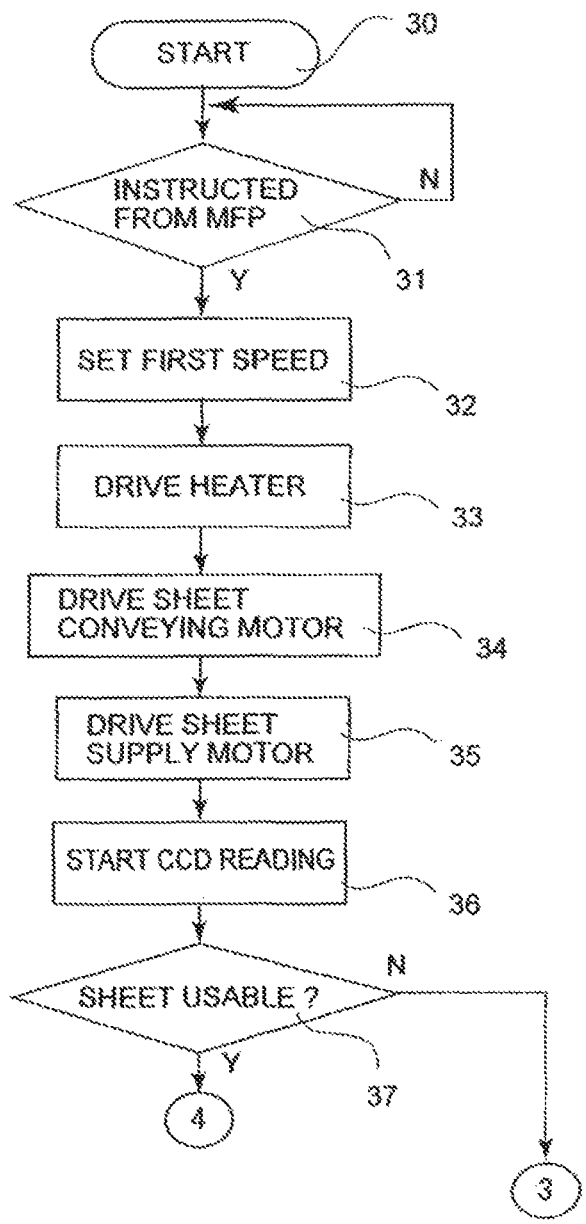
FIG. 6 is a flow chart showing the process of the second embodiment.
Figure 7:
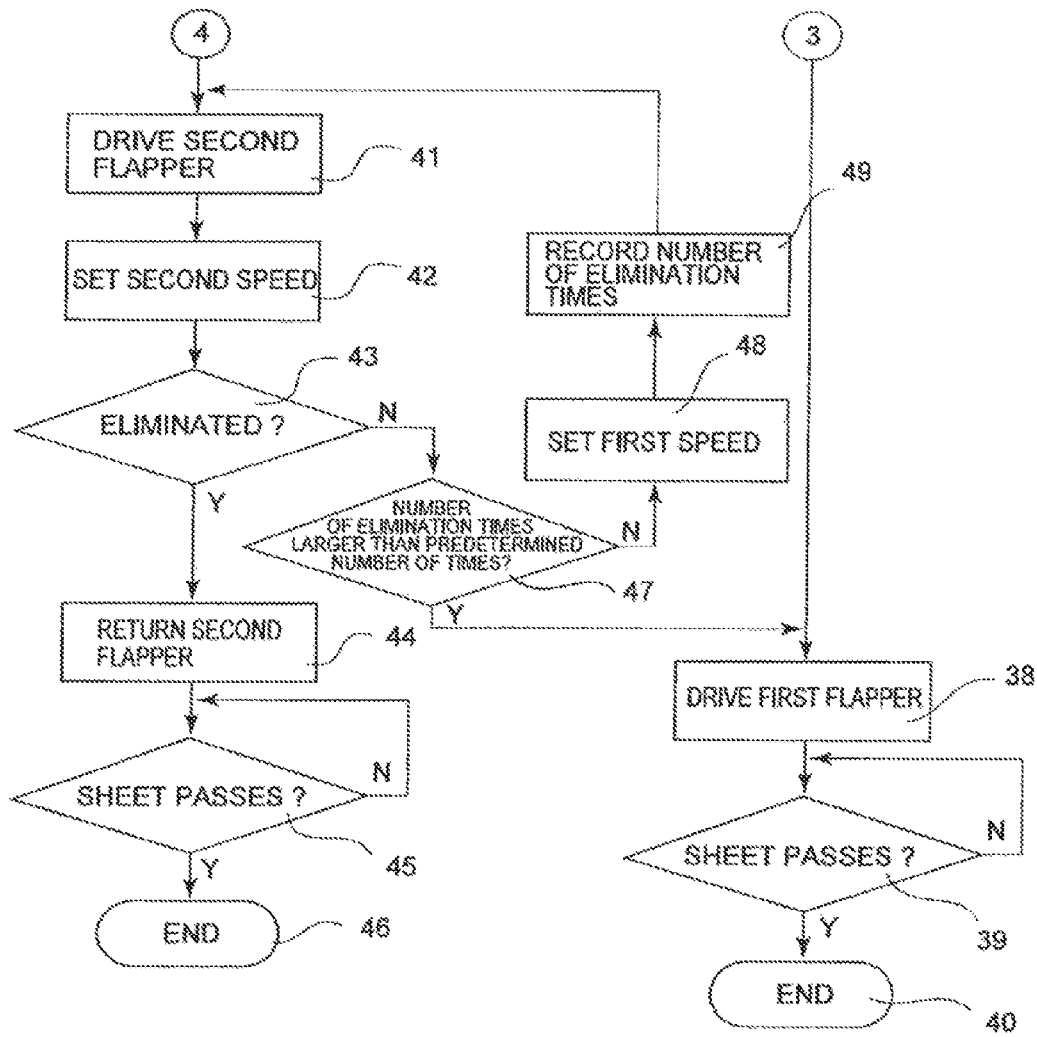
FIG. 7 is a flow chart showing the process of the second embodiment.

Next, the second embodiment will be explained. In this embodiment, the explanation duplicated with the first embodiment will be omitted and the differences will be explained. In this embodiment, the image eliminator 10 has a number of elimination times recording portion for making a punch hole at a predetermined position of a sheet according to the number of elimination times after elimination of an image. The number of elimination times recording portion records the number of elimination times every image elimination. Hereafter, in the second reading, the reader 9 reads the density of the sheet image and the number of punch holes. FIGS. 6 and 7 show the flow charts of the operations of the image elimination apparatus in this embodiment, though they are the same operations as those at 30 to 37 shown in FIG. 4 of the first embodiment, so that the explanation thereof will be omitted. Hereinafter, the operations following the second reading will be explained. The second reading reads whether the image is eliminated or not and the number of punch holes. Here, when the sheet image is not eliminated and the CPU 19 judges from the status of the punch holes that as a result of comparison (47), the number of elimination times does not reach a predetermined number of times (N at 47), the CPU 19 sets the sheet conveying speed to the first speed which is the same as that at the execution time of the first reading (48), then permits the sheet to pass again through the image eliminator 10, eliminates the image, and records the number of elimination times. Hereafter, the CPU 19 drives the second flapper 17 (41), sets the second speed (47), permits the sheet to pass through the second sheet conveying path 18, and executes again the second reading by the reader 9. In the second reading, the reader 9 reads whether the image is eliminated or not and reads the number of punch holes. By reading the number of punch holes, the number of elimination times is judged (47). When judging that the number of elimination times reaches the predetermined number of times (Y at 47), the CPU 19 drives the first flapper 16 (38), in order to abolish the sheet, guides the sheet to the stack box 11, and finishes the elimination process (40). If the CPU 19, from the number of punch holes read simultaneously in the second reading, judges that the number of elimination times does not reach the predetermined number of times, the CPU 19 guides the sheet to the MFP 1.

By use of the aforementioned constitution, an image elimination apparatus for surely eliminating the image of a used sheet, when the number of elimination times reaches the predetermined number of times, abolishing the sheet, thereby removing a sheet of a large number of elimination times and of a deteriorated quality can be provided.

Next, the third embodiment equipped separately with the first reader and second reader will be explained.

Figure 8:
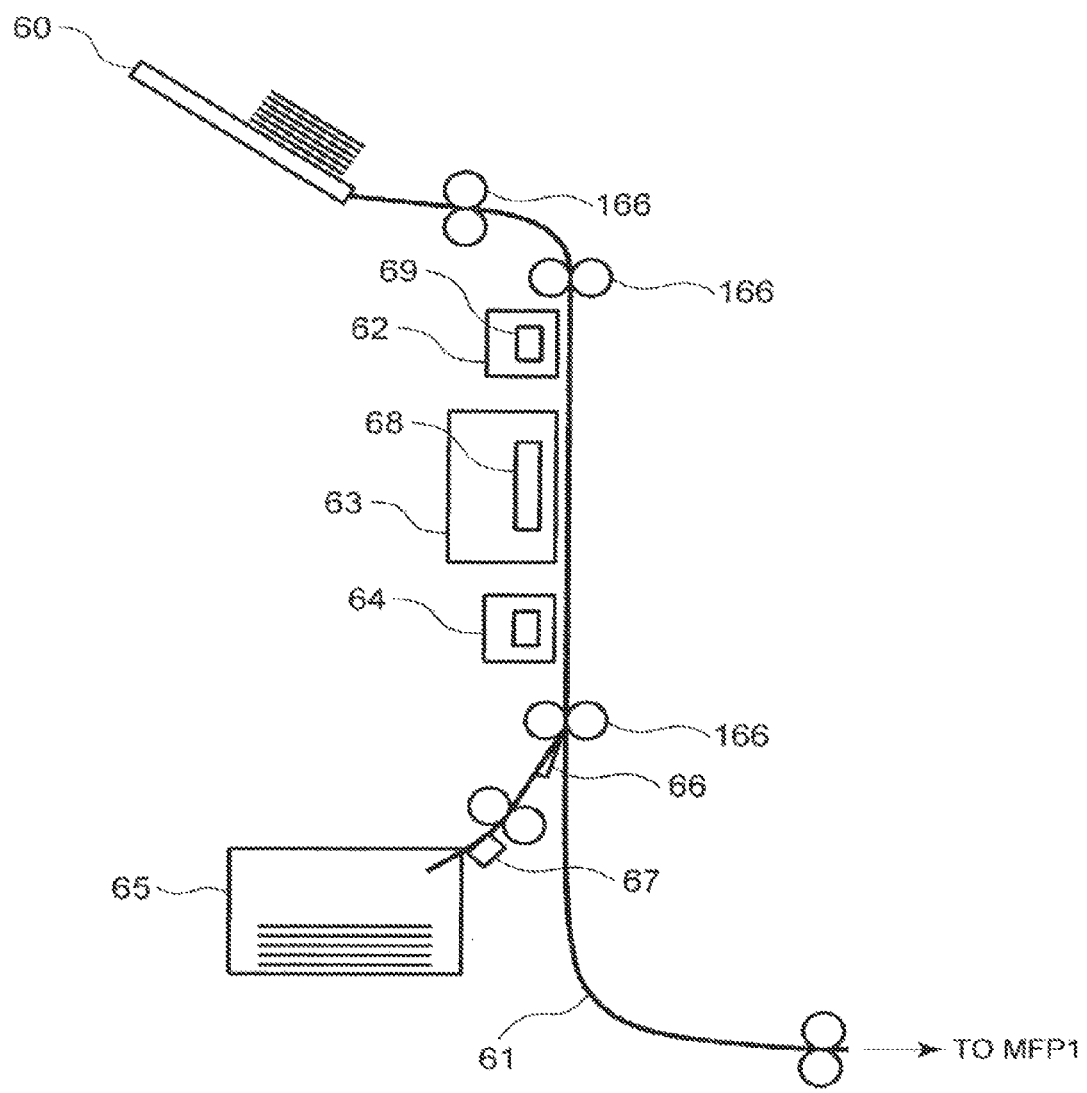
FIG. 8 is a schematic view of the image elimination apparatus of the third embodiment.

FIG. 8 is a schematic view of the image elimination apparatus 2 relating to this embodiment. From the operation of reading the status that the sheet in this embodiment is a judgment material of possibility of use to the operation of image elimination and the operations after reading whether the image is eliminated from the sheet or not are almost the same as those of the first embodiment, so that the explanation will be omitted. The image elimination apparatus 2 of this embodiment is built in the post-processing device 3 similarly to the first embodiment, includes a sheet supply tray 60, along a sheet conveying path 61, a first reader 62 and an image eliminator 63, and a second reader 64 on the downstream side of the image eliminator 63 on the sheet conveying path 61 and furthermore has a stack box 65 installed to abolish the sheet which comes off the sheet conveying path 61 and is judged as nonreusable.

Next, the operations will be explained. Firstly, if sheet elimination is instructed from the control panel of the MFP 1, the CPU 19 turns on a heater 68 and rotates rollers 166. Next, the CPU 19 picks up the sheets loaded on the sheet supply tray 60 one by one. And, the first reader 62 reads the image on the sheet surface and detects the status of creases of the sheet. Here, when the sheet is judged as nonreusable, the CPU 19 drives a flapper 66, guides the sheet to the stack box 65, confirms that the sheet passes through a sensor 67, and then finishes the elimination process. On the other hand, while the sheet judged as reusable passes through the image eliminator 63, the heater 68 applies heat to the sheet to eliminate the image. While the sheet passing through the image eliminator 63 passes furthermore through the second reader 64, the CPU 19 checks whether the image on the sheet is eliminated or not. The second reading may be executed with lower precision than the first reading. Therefore, the density of the CCD used may be lowered than that of a CCD sensor installed in the first reader 62. In the second reading, when that the image is not eliminated is judged, in order to abolish the sheet, the COU 19 drives the flapper 66, guides the sheet to the stack box 65, confirms that the sheet passes through the sensor 67, and then finishes the elimination process. On the other hand, the sheet judged that the image is eliminated is supplied to the MFP 1 and the elimination process is finished.

As mentioned above, the first reader 62 and second reader 64 are installed separately, thus there is no need to return the sheet again to the reader after image elimination. Therefore, the labor and time of returning the sheet to the reader are saved and there is no need to switch the sheet conveying speed, so that the image can be eliminated efficiently from the sheet and the sheet can be supplied quickly to the image forming apparatus.

In the present invention, furthermore, by use of the fourth embodiment indicated below, the processing efficiency can be improved. In this embodiment, the arrangement of the readers and image eliminators may be the same as that of either of the first embodiment and third embodiment, though the first embodiment will be explained as an example.

Figure 9:
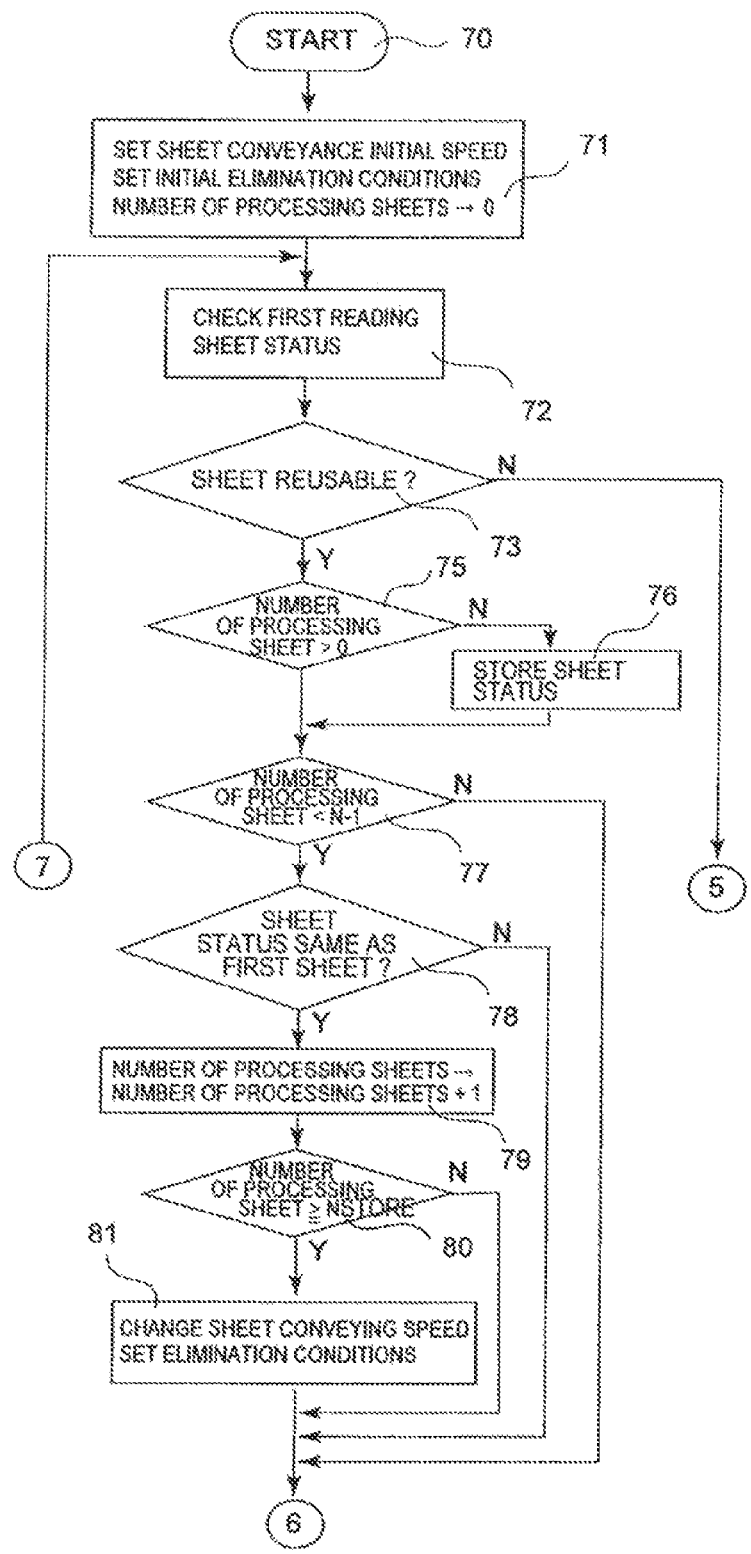
FIG. 9 is a flow chart showing the process of the fourth embodiment.
Figure 10:
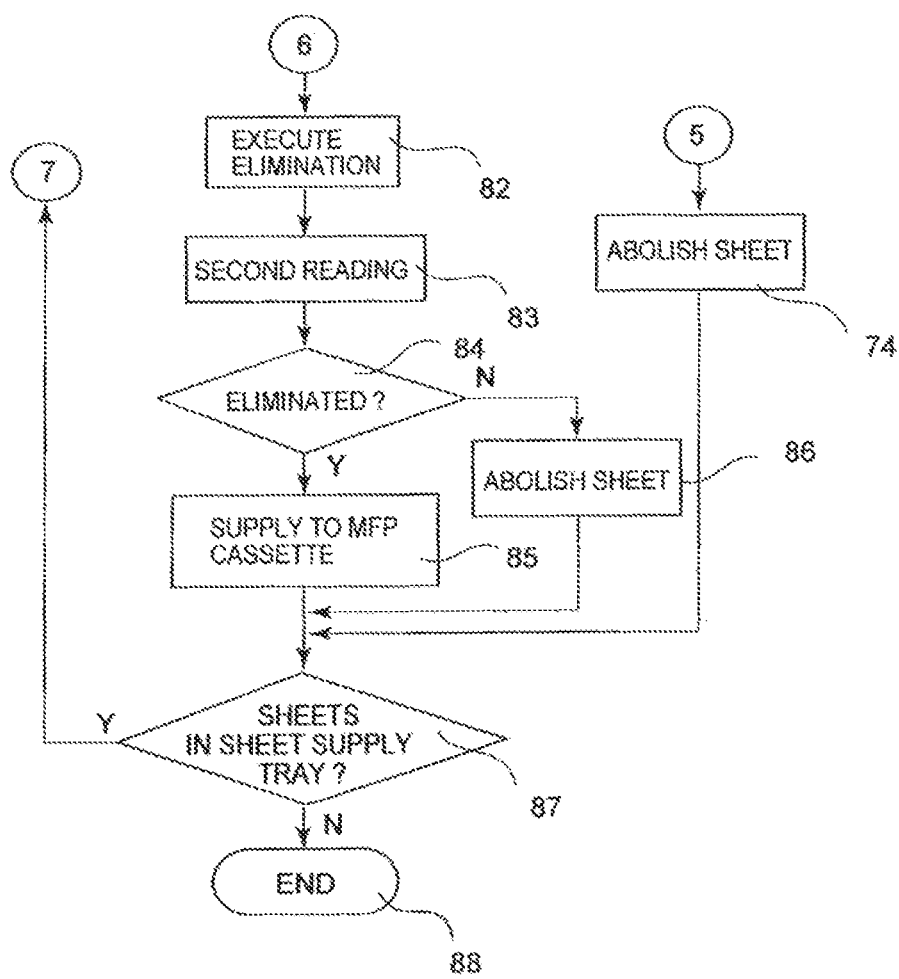
FIG. 10 is a flow chart showing the process of the fourth embodiment.

In this embodiment, when a predetermined number of sheets n to be processed first are all almost uniform and reusable, for the residual sheets, the first reading and elimination are executed by conveying at a slightly fast speed. FIGS. 9 and 10 show the flow charts of the operations of the image elimination apparatus 2 in this embodiment. Firstly, as an initial state, the speed for enabling highly precise reading and sure image elimination and the number of sheets to be processed 0 are set (71). Next, the status of the sheets is read by the first reader 62 (72) and the possibility of reuse is decided (73). Here, the sheets judged as unusable (N at 73) are abolished (74). At the time of the first reading, for the first sheet, the first reader 62 reads the position indicating the highest density on the sheet and the information on the print condition of the sheet such as the density and stores the information in the RAM 22 installed in the apparatus (75, 76). Next, according to the settings of the initial conditions stored beforehand in the ROM 21, the first reader 62 executes the first reading and elimination of the image on the sheet. Here, if the read sheet is reusable and the print condition of the sheets such as the highest density of the first sheet stored in the RAM 22 is almost the same (78), the first reader 62 counts up the number of processed sheets (79). Until the counted-up number of processed sheets reaches the predetermined number of sheets n, the processing is continued in the state that the conditions such as the sheet conveying speed and the temperature of the heater 14 are kept straight as the initial conditions. When the counted-up number of processed sheets reaches the predetermined number of sheets n (80), that the residual sheets stacked on the paper supply tray 7 are all reusable, and the print condition is uniform, and the first reading precision for the residual sheets may be lowered smoothly, thus the sheet conveying speed relating to the first reading and elimination is set to a speed faster than the initial speed. Further, from the highest density of the image on the sheet stored in the RAM 22, the CPU 19 obtains a necessary and sufficient temperature to eliminate the image indicating the highest density and sets the heater 14 to the temperature (81).

Hereafter, when the first reading (72), elimination (82), and second reading (83) are continued until the sheets on the paper supply tray 7 are all used up under the same conditions and that the sheets are all gone is detected (87), the CPU 19 finishes the process (88). On the other hand, when that between the first sheet and the "n"th sheet, there is at least one sheet which is not reusable or is different in the sheet status is judged, assuming the sheets stacked on the sheet supply tray 7 as non-uniform, the process is continued without changing the conditions such as the sheet conveying speed and the temperature of the heater 14 which are set first. Further, when that the sheet status is reusable and uniform is judged, the first reading may be omitted. Further, when the highest density of the sheet does not reach a preset value, assuming the image not to be printed, to turn off the heater 14 and not eliminate the image is possible. Furthermore, unless the image eliminator 10 changes the temperature of the heater 14, from the read density of the image on the sheet, the passing speed of the sheet through the image eliminator 10 can be set. Further, when the first sheet to the "n"th sheet are judged to be almost uniform in the sheet status and the sheets after the "n"th sheet are read with the first reading precision lowered, if that the sheet status is different greatly is detected, to execute the first reading of the sheet under the initial conditions is possible.

In this embodiment, when the first sheet to the "n"th sheet are reusable and the sheet status is almost uniform, in the second reading, only the position indicating the highest density stored in the RAM 22 is decided as a reading object and the number of comparison times for checking whether the image is eliminated or not can be reduced. Furthermore, to increase the sheet conveying speed before the sheet reaches the position indicating the highest density and after reading and improve the processing speed is possible.

According to the embodiment aforementioned, when eliminating sheets used in a conference in a batch, that is, when processing a large quantity of sheets in almost the same status at a time by the image elimination apparatus 2, there is no need to read the statuses one by one for all the sheets. Namely, only by checking only the preset status of the n sheets, the conditions such as the first reading speed and the set temperature of the heater 68 are set, so that the processing time can be reduced. Further, when eliminating the image, applying unnecessary heat to the sheet can be prevented. Therefore, the life span of the sheets can be lengthened and the power consumption can be reduced.

Figure 11:
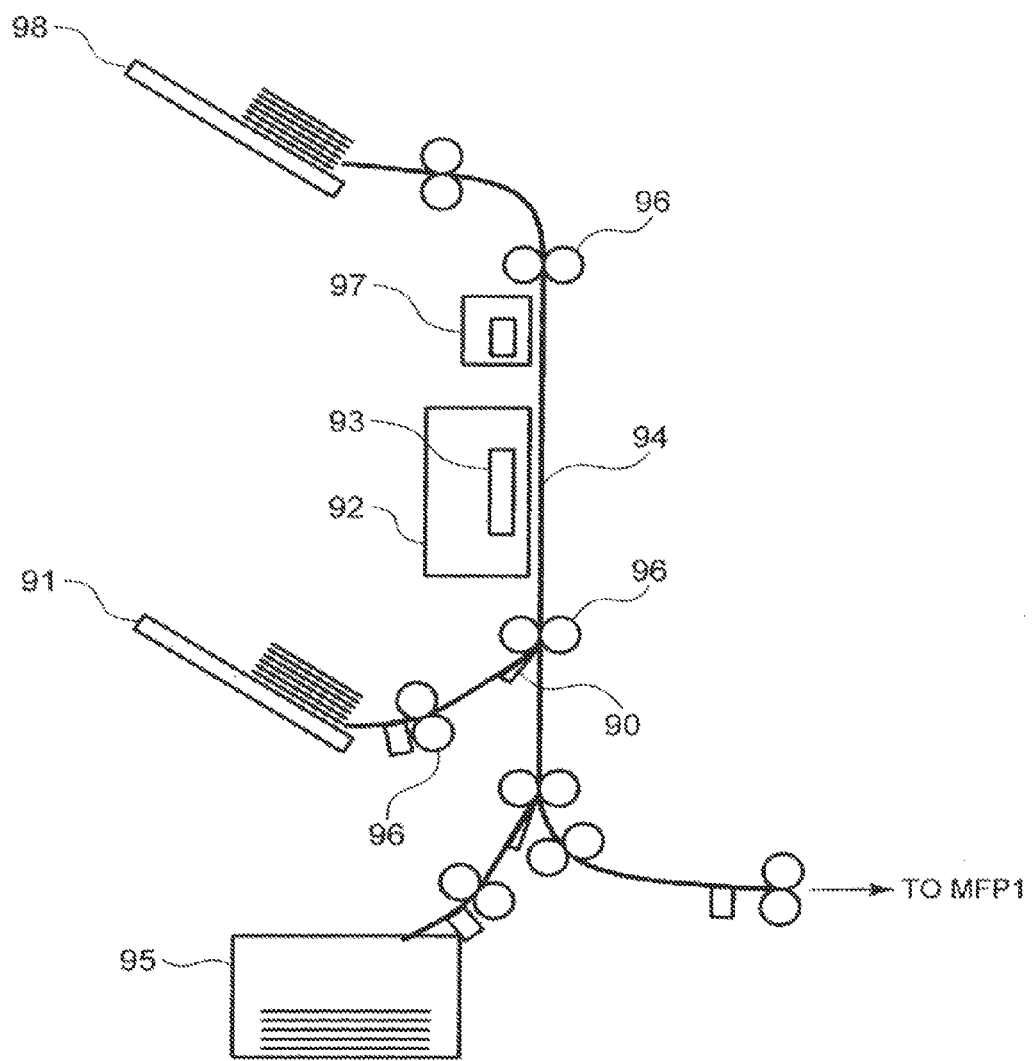
FIG. 11 is a schematic view of the image elimination apparatus of the fifth embodiment.

The present invention can realize furthermore high efficiency of the processing by the fifth embodiment indicated below. The fifth embodiment performs the processes from the first reading to image elimination for all the sheets stacked on a sheet supply tray 98. Thereafter, the second reading is performed for all the sheets with the image eliminated. FIG. 11 is a schematic view of the image elimination apparatus 2 relating to this embodiment. The constitution of the image elimination apparatus 2 does not include the second sheet conveying path as indicated in the first embodiment and instead, includes a second flapper 90 and a sheet tray 91. Hereinafter, the operation of the fifth embodiment will be explained. Firstly, the sheets are picked up one by one from the sheet supply tray 98 and a reader 97 reads whether the sheets are reusable or not. Next, the sheets are eliminated by a heater 93 of an image eliminator 92. In this embodiment, the sheets finishing the operations to image elimination are stacked on the sheet tray 91 by driving the second flapper 90. The operations from the first reading to stacking on the sheet tray 91 via elimination are performed until the sensor installed on the sheet supply tray 98 detects that the sheets stacked on the sheet supply tray 98 are all gone. Further, the sheets judged as nonreusable, similarly to the aforementioned embodiment, are guided to a stack box 95. After that the sheets on the sheet supply tray 98 are gone is detected and the first reading of the sheets and image elimination are finished, until the sheets are conveyed to the sheet tray 91, as soon as sufficient time elapses, the sheet tray 91 slides upward, and the heating of the heater 93 installed in the image eliminator 92 is finished. Next, the sheet tray 91 slides from the position where the sheet tray 91 is generally situated when the first reading and elimination are executed up to the position where the sheets can be supplied to a sheet conveying path 94. The sheet conveying speed is set to the second speed, and the sheets are picked up one by one from the slid sheet tray 91 onto the sheet conveying path 94, and the second reading is executed. Here, whether the image on each sheet is eliminated effectively or not is checked and the sheets that the image elimination cannot be confirmed are guided to the stack box 95.

Further, to install a pickup roller for picking up sheets from the sheet tray 91 with the sheet tray 91 fixed unless the sheet tray 91 slides, pick up the sheets stacked on the sheet tray 91 one by one, rotate a roller 96 in the opposite direction to the first reading, permit the roller 96 to pass through the reader 97, and check whether the sheet image is eliminated or not is possible. Further, in this case, the branch point to the entrance to the MFP 1 is installed on the upstream side (above the reader shown in FIG. 11) of the reader 97.

By use of this embodiment, in the case of a large number of processing sheets, only one switching of the first speed and second speed is sufficient, thus the processing time can be reduced. Further, at the time of the second reading, there is no need to turn on the heater 93, so that the power consumption can be reduced.

Figure 12:
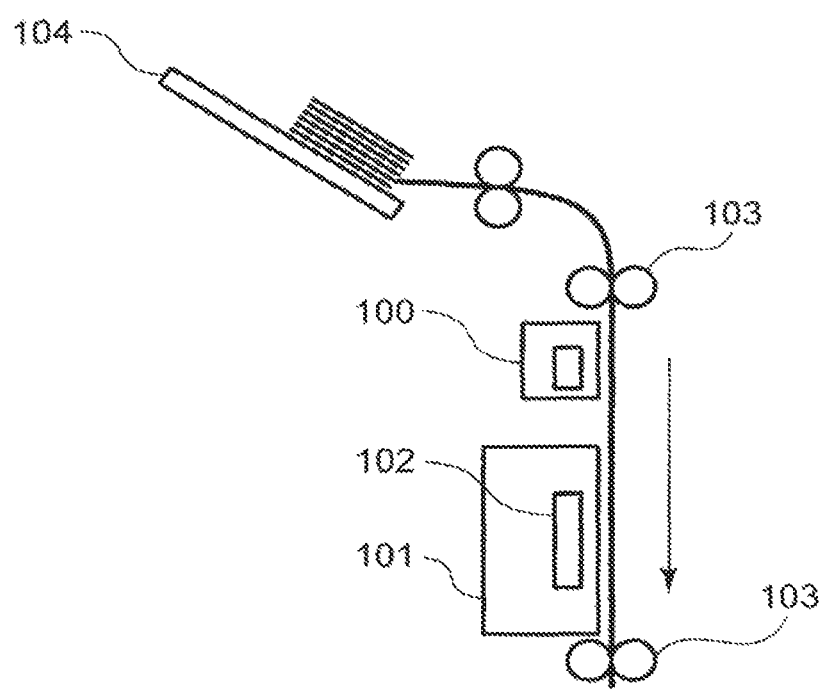
FIG. 12 is a schematic view of the reader and image eliminator of the image elimination apparatus of the sixth embodiment.
Figure 13:
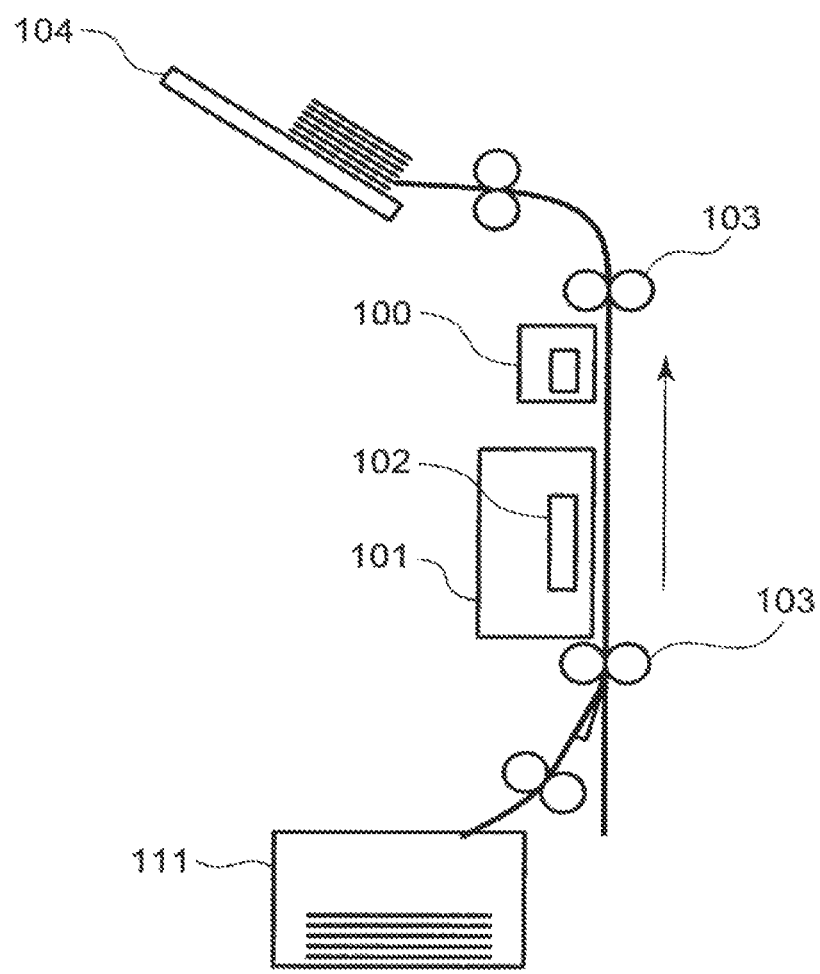
FIG. 13 is a schematic view of the reader and image eliminator of the image elimination apparatus of the sixth embodiment.
Figure 14:
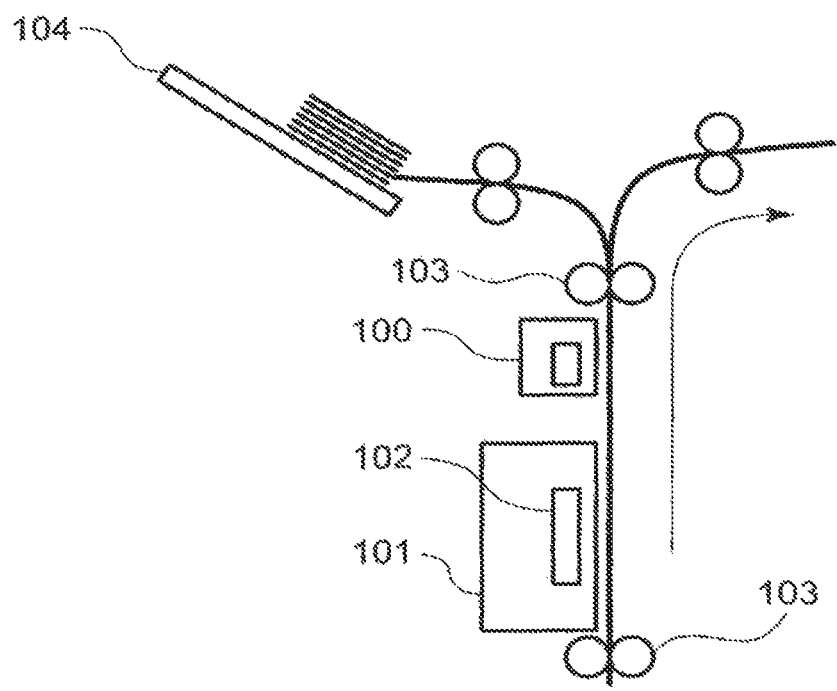
FIG. 14 is a schematic view of the reader and image eliminator of the image elimination apparatus of the sixth embodiment.

The present invention can be realized also by the sixth embodiment indicated next. FIGS. 12 to 14 are schematic views showing this embodiment. In the drawing, the arrows show the passing direction of sheets. Firstly, the sheet supplied from a sheet supply tray 104 is conveyed at the first speed, and as shown in FIG. 12, a reader 100 executes the first reading and detects the status of the sheet, and a heater 102 of an image eliminator 101 is heated, thus the image of the sheet is eliminated. The CPU 19, upon confirmation of passing of the sheet through the image eliminator 101, stops the sheet. And, the CPU 19 rotates a roller 103 in the opposite direction, conveys the sheet as shown in FIG. 13, and returns the leading edge of the sheet up to the start position of the reader 100. Next, the CPU 19 sets the conveying speed to the second speed, drives the roller 13 to permit the sheet to pass through the reader 100, and executes the second reading in order to check whether the image on the sheet is eliminated or not. Here, when at the time of the first reading, the sheet is reusable and at the time of the second reading, the image of the sheet is eliminated on a reusable level, the sheet is reusable by the MFP 1, thereby is conveyed to the sheet cassette 4 in the MFP 1. When judging at the time of the first reading that the sheet is not reusable or when judging at the time of the second reading that the image of the sheet is not eliminated on the reusable level, the CPU 19 conveys and abolishes the sheet at a stack box 111. Further, as shown in FIG. 14, when conveying the sheet in the opposite direction to the direction at the time of execution of the first reading and elimination, the elimination of the image may be checked. In this way, a conveying path is installed from above to the MFP 1 as shown in FIG. 14, thus the number of sheet conveying times can be reduced and the processing speed can be increased. In this embodiment, there is no need to install the second sheet conveying path as in the first embodiment, so that the possibility of reuse of used sheets can be executed at high precision, and the processing speed can be increased, and furthermore, the image elimination apparatus can be miniaturized.

As mentioned above, according to the present invention, an image elimination apparatus and an image eliminating method of judging the possibility of reuse of used sheets at high precision and at a fast processing speed can be provided.

What is claimed is:

1. An image elimination apparatus which eliminates an image formed on a sheet, the image elimination apparatus comprising:
   a sheet supply unit that supplies the sheet on which the image is formed;
   a first reader that reads the sheet supplied by the sheet supply unit;
   an image eliminator that eliminates the image formed on the supplied sheet;
   a second reader that reads the sheet after the sheet has passed through the image eliminator;
   a sheet tray onto which a sheet which is determined to be not reusable is stacked, and onto which a sheet having an image judged to be not eliminated is stacked; and
   a controller that:
      controls a conveyance speed of the sheet so that the first reader reads the sheet as the sheet is being conveyed at a first speed,
      judges whether the sheet is reusable based on the reading result of the first reader, controls a conveyance speed of the sheet so that the second reader reads the sheet as the sheet is being conveyed at a second speed faster than the first speed, and judges whether the image formed on the sheet has been eliminated based on the reading result of the second reader.

2. The image elimination apparatus according to claim 1, wherein the controller judges whether the read sheet is reusable based on any one of a print rate, creases and corner folds of the supplied sheet as the reading result of the first reader.

3. The image elimination apparatus according to claim 1, wherein the first reader and the second reader share a single reader, and wherein the image elimination apparatus further comprises:

a first sheet conveying pass that conveys the sheet supplied by the sheet supply unit, the single reader being disposed along the first sheet conveying pass and the sheet tray being disposed at a downstream side of the single reader in a sheet conveying direction;

a second sheet conveying pass that braches from the first sheet conveying pass at a downstream side of the single reader and at a upstream side of the sheet tray in the sheet conveying direction, and joins the first sheet conveying pass at a upstream side of the single reader in the sheet conveying direction; and a separating unit that switches a conveyance direction of the sheet between the first sheet conveying pass and the second sheet conveying pass.

4. The image elimination apparatus according to claim 1, wherein the first reader and the second reader share a single reader, wherein the image elimination apparatus further comprises:

a conveying pass that conveys the sheet supplied from the sheet supply unit to the sheet tray, the single reader and the image eliminator being disposed along the conveying pass on an upstream side of the sheet tray in a sheet conveying direction, and wherein the controller controls the conveying speed of the sheet so that the sheet is conveyed to the single reader and then the image eliminator at the first speed and the sheet is conveyed from the image eliminator and then back to the single reader at the second speed.

5. The image elimination apparatus according to claim 1, further comprising:

a conveying pass that extends, in order, from the sheet supply unit to the first reader, the image eliminator, the second reader and the sheet tray, wherein the controller controls a sheet conveying roller so that the sheet is conveyed along the conveying pass, in order, to the first reader, the eliminator, and the second reader.

6. The image elimination apparatus according to claim 1, wherein the controller controls a sheet conveying roller so that the sheet which is judged as non-reusable is conveyed to the sheet tray.

7. The image elimination apparatus according to claim 1, wherein the image eliminator eliminates the image formed on the sheet by heating the sheet to a predetermined temperature.

8. The image elimination apparatus according to claim 1, wherein the sheet tray is a stack box.

* * * * *